(12) United States Patent
Balderrama et al.

(10) Patent No.: US 9,470,257 B2
(45) Date of Patent: Oct. 18, 2016

(54) FASTENER ASSEMBLY FOR INSULATION BLANKET

(71) Applicant: NMC GROUP, INC., Pomona, CA (US)

(72) Inventors: Mark Anthony Balderrama, Pomona, CA (US); Steve Richard Duhamel, Pomona, CA (US)

(73) Assignee: NMC GROUP, INC., Pomona, CA (US)

( * ) Notice: Subject to any disclaimer, the term of this patent is extended or adjusted under 35 U.S.C. 154(b) by 0 days.

(21) Appl. No.: 14/255,537

(22) Filed: Apr. 17, 2014

(65) Prior Publication Data

US 2015/0300396 A1 Oct. 22, 2015

(51) Int. Cl.
*F16B 37/14* (2006.01)
*F16B 5/06* (2006.01)
*F16B 37/04* (2006.01)

(52) U.S. Cl.
CPC .............. *F16B 37/14* (2013.01); *F16B 5/0692* (2013.01); *F16B 37/048* (2013.01); *F16B 37/145* (2013.01)

(58) Field of Classification Search
CPC ........................... E04B 1/7629; F16B 37/145
USPC .................... 411/171, 338; 52/404.2, 410
See application file for complete search history.

(56) References Cited

U.S. PATENT DOCUMENTS

| 3,238,835 | A | * | 3/1966 | Rosenberg | 411/338 |
| 3,285,311 | A | * | 11/1966 | Cushman | 52/787.1 |
| 3,829,150 | A | * | 8/1974 | Moore | 296/39.3 |
| 3,881,769 | A | * | 5/1975 | Metzke | 296/190.08 |
| 4,045,076 | A | * | 8/1977 | Day et al. | 296/39.3 |
| 4,447,055 | A | * | 5/1984 | Ahrens | 482/35 |
| 4,490,083 | A | * | 12/1984 | Rebish | 411/338 |
| 4,571,136 | A | * | 2/1986 | Peek | 411/437 |
| 4,770,582 | A | * | 9/1988 | Junemann et al. | 411/182 |
| 4,780,037 | A | * | 10/1988 | Payne | 411/433 |
| 4,850,778 | A | * | 7/1989 | Clough et al. | 411/433 |
| 5,671,576 | A | * | 9/1997 | Kluser | 52/512 |
| 7,584,582 | B1 | | 9/2009 | Hutter, III | |
| 8,210,785 | B1 | * | 7/2012 | Gager | 411/429 |
| 8,434,982 | B2 | * | 5/2013 | Henriksen, Jr. | 411/338 |
| 2011/0076113 | A1 | * | 3/2011 | Mueller et al. | 411/500 |

* cited by examiner

*Primary Examiner* — Flemming Saether
(74) *Attorney, Agent, or Firm* — Russo & Duckworth, LLP; David G. Duckworth

(57) ABSTRACT

A fastener assembly for affixing insulation blankets to a substrate is provided. The fastener assembly includes an attachment member having a construction for affixing to a substrate as well as a first fastener member preferably in the form of a male threaded stud. The fastener assembly further includes a cap fastener. The cap fastener includes a cap member and a second fastener member preferably in the form of a female threaded extension for threadably affixing to the first fastener member. The cap member has an exterior side and an interior side. The cap member's exterior side preferably has a shape for rotation by a tool. Meanwhile, the cap member's interior side has a circular recess concentric with the cap fastener's female threaded extension. When assembled, the circular recess forms a circular insulating cavity between the cap member and an insulation blanket.

6 Claims, 4 Drawing Sheets

FASTENER ASSEMBLY FOR INSULATION BLANKET

BACKGROUND OF THE INVENTION

The present invention relates to mounts and fasteners. More specifically, the present invention relates to fasteners for affixing thermal insulation blankets to a substrate, such as the engine nacelles of an aircraft.

It is common to secure an "attachment member" such as a fastener or the like, onto a supporting surface, also referred to as a substrate. For example, it is known to mount threaded fasteners or the like onto a substrate so as to be able to attach additional components to the substrate's surface. Adhesive bonded attachments are well known for connecting a component to a threaded stud or bolt so as to mount components to a substrate. These adhesive attachment members typically include a base providing a bonding surface which is adapted to receive a curable bonding agent. The base is then pressed against the substrate surface so as to allow the bonding agent to cure.

Attachment members including a base and male or female threaded fastener have been used to support and affix thermal insulation blankets to a substrate wherein the insulation blanket is provided to act as a heat-shield to protect surrounding structures and components. As but one example, such thermal insulation blankets have been mounted on the inboard side of aircraft engine nacelles. Typically, a thermal insulation blanket is made of a refractory cloth material which includes multiple grommets forming mounting holes for affixing the blanket to the substrate. A plurality of adhesive bonded attachment members are affixed to the nacelle substrate at various positions with the attachment members' male or female threaded elements projecting through the insulation blanket's mounting holes. Separate cooperative threaded elements, such as nuts or bolts, are then secured to the attachment member's threaded elements for retaining the insulation blanket in place.

As a result of the high heat environment, specialized fasteners have been developed. For example, U.S. Pat. No. 7,584,582, which is incorporated by reference herein, discloses an adhesive bonded attachment assembly for use in affixing insulation blankets to a substrate. The attachment assembly includes an attachment member including a base for adhesively affixing to a substrate as well as a threaded element for projecting through an insulation blanket's mounting hole. In addition, the assembly includes a cap having a radially enlarged cap member and a second threaded element for affixing to the attachment member. The cap member has a size so as to overlie and engage the insulation blanket so as to keep it in place. Providing additional thermal protection, the cap member has an inboard piece and an outboard piece forming an internal chamber. The cap's inboard piece and outboard piece are typically made of metal and an insulation material is positioned within the cap's central chamber. Unfortunately, the fastener assembly described in U.S. Pat. No. 7,584,582 suffers from several drawbacks. First, because the fastener assembly is primarily made of metal, the assembly is undesirably heavy. In addition, the cap fastener is made of multiple components which must be assembled together thereby introducing undesirable complexity.

All-metal fasteners provide extremely high strength to a fastener element. However, adhesives and potting materials typically do not bond well to an all-metal material, such as titanium, as well as to a composite or plastic material. Further, metal fasteners are typically heavy and expensive. Conversely, plastic fasteners provide low weight, but lesser strength values than all-metal fasteners.

Therefore, there is a significant need for an improved attachment assembly for affixing insulation blankets to a substrate.

It would be desirable to provide the fastener assembly with a decrease in weight, reduced manufacturing costs, and improved thermal protection.

SUMMARY OF THE INVENTION

Briefly, in accordance with the invention, an improved fastener assembly for affixing thermal insulation blankets to a substrate is provided. The assembled components are described herein as including the substrate and thermal insulation blanket. The term "substrate" is intended to be interpreted broadly as to include any surface or fixtures upon which an insulation blanket is to be mounted. Moreover, the term "insulation blanket" is to be interpreted broadly to include any material, flexible or otherwise, providing thermal protection, either from conduction, convection or radiation.

The fastener assembly further includes an attachment member attached to the substrate. The attachment member may be constructed in various manners as can be determined by those skilled in the art to provide a structure upon which a second part of a fastener can be fastened. Preferably, the attachment member includes an enlarged base providing a mounting surface for adhesive affixation to the substrate. Moreover, it is preferred that the attachment member include a first fastener element, such as in the form of a male or female threaded element. Though it is preferred that this first fastener element be male or female threaded, other known fastener constructions can be utilized.

The fastener assembly of the present invention further includes a cap fastener. The cap fastener includes a radially enlarged cap member having a radial size and shape greater than an insulation blanket mounting hole. The cap member includes an exterior side and an interior side. The cap fastener further includes a second fastener element extending from the cap member's interior side. Again, the second fastener element may be constructed in any manner so as to affix to the attachment member's first fastener element. However, it is preferred that this second fastener element be a male or female extension of a size so as to project at least partially through the insulation blanket's mounting hole to affix to a cooperatively constructed first fastener element adhered to the substrate. Alternative first and second fastener elements may include hook and pile, snaps, press-fit arrangements, etc. Where the fastener assembly's attachment member and cap fastener are affixed together utilizing male and threaded elements, it is preferred that the cap fastener include a construction to allow it to be manually rotated, and thereby affixed, relative to the attachment member. Again, various known constructions for rotating the cap fastener may be selected by those skilled in the art including slots for a standard or Phillips screwdriver. However, a preferred construction includes a hexagonal projection formed upon the cap member's exterior side for mating to a socket tool. Preferably, this hexagonal projection has a diameter smaller than the diameter of the enlarged cap member.

To provide additional thermal protection, the cap member's interior surface includes a circular recess surrounding the second fastener element. When the fastener assembly is complete with an insulation blanket positioned between the substrate and cap fastener, the circular recess forms a circular insulating cavity between the cap member and insulation blanket which provides additional insulation and reduced heat transfer through the fastener assembly. Preferably, the cap member's interior surface has a substantially concave shape so as to form the circular recess surrounding the second fastener element.

The various components of the fastener assembly may be made of various materials. However, it is preferred that the attachment member include a base made of composite or plastic material such as woven polyimide. Similarly, it is preferred that the cap fastener's cap member be made of composite or plastic material such as woven polyimide. Where the attachment member and cap fastener are affixed together utilizing male and female threaded fasteners, it is preferred that these threaded components be made of metal, such as a 300 series stainless steel.

Thus it is an object of the present invention to provide an improved fastener assembly for affixing insulation blankets to a substrate.

It is still an additional object of the present invention to provide an improved fastener assembly that is of decreased weight, low cost, and decreased complexity.

These and other objects and advantages of the invention will be apparent to those skilled in the art from the following detailed description taken in conjunction with the drawings.

DETAILED DESCRIPTION OF THE INVENTION

Figure 1:
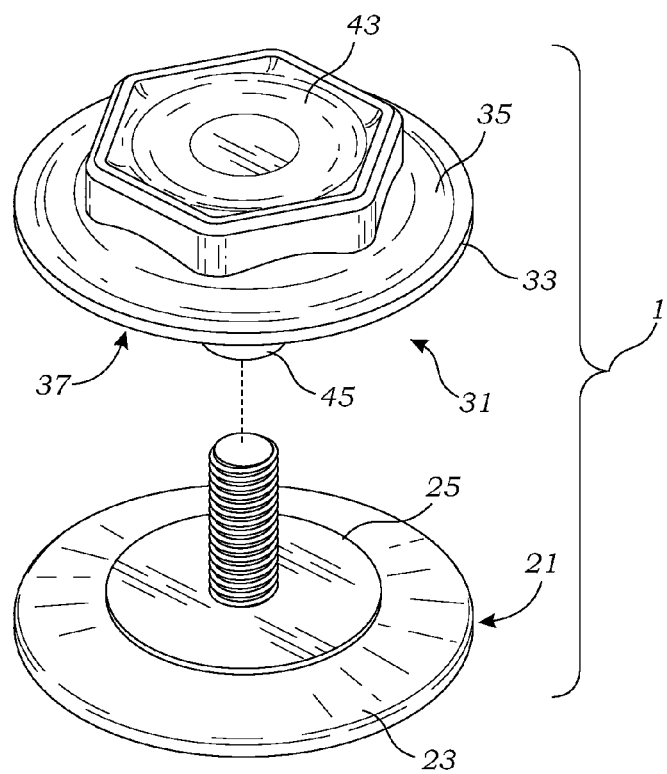
FIG. 1 is an exploded top perspective view of the fastener assembly for insulation blanket of the present invention.
Figure 2:
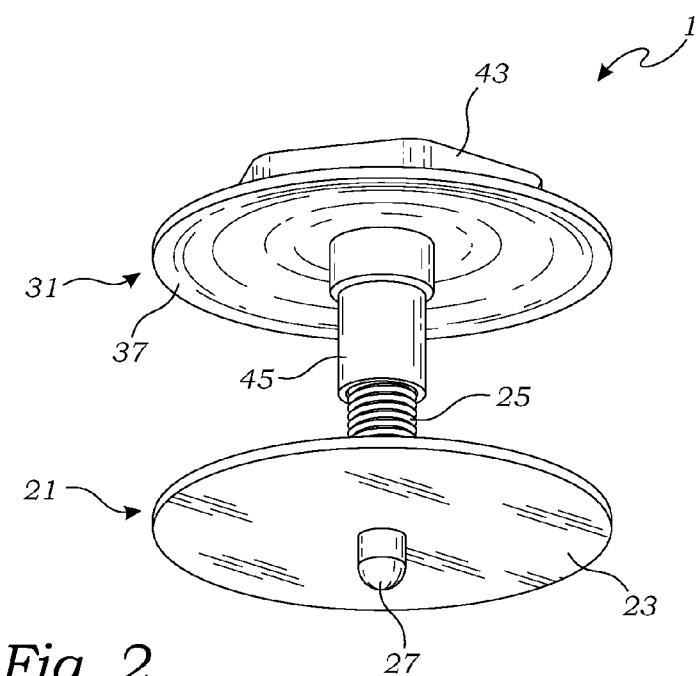
FIG. 2 is a bottom perspective view of the fastener assembly for insulation blanket of the present invention.
Figure 3:
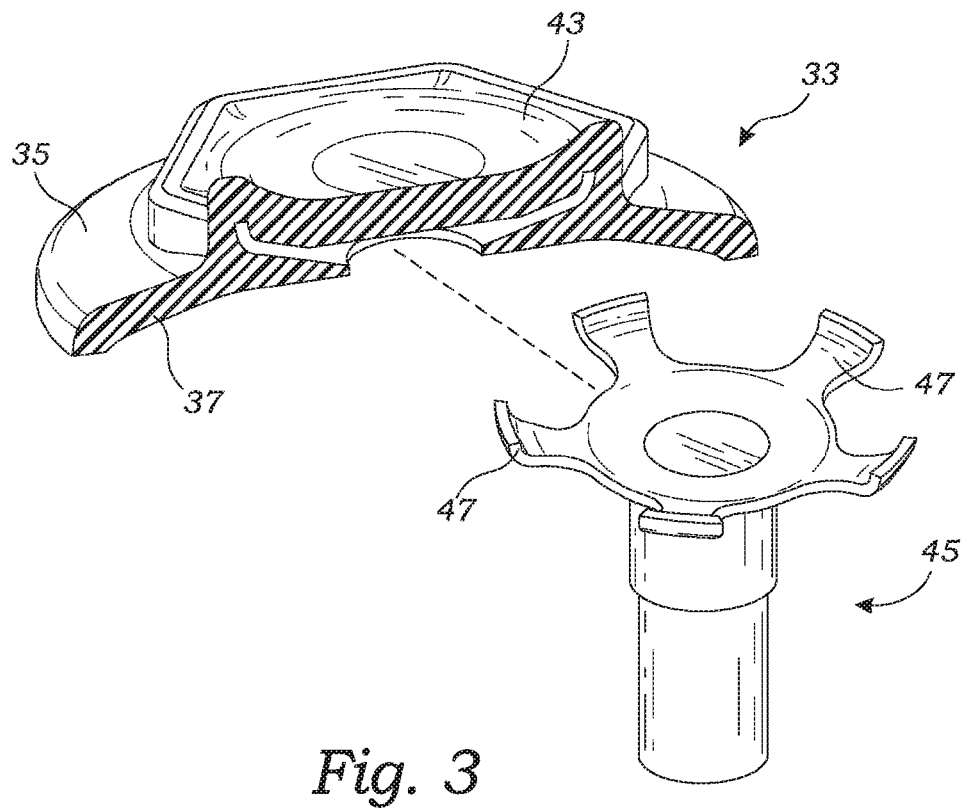
FIG. 3 is a top partial cut-away perspective view of the cap fastener of the present invention.

While the present invention is susceptible of embodiment in various forms, as shown in the drawings, hereinafter will be described the presently preferred embodiments of the invention with the understanding that the present disclosure is to be considered an as exemplification of the invention, and it is not intended to limit the invention to the specific embodiments illustrated.

Figure 4:
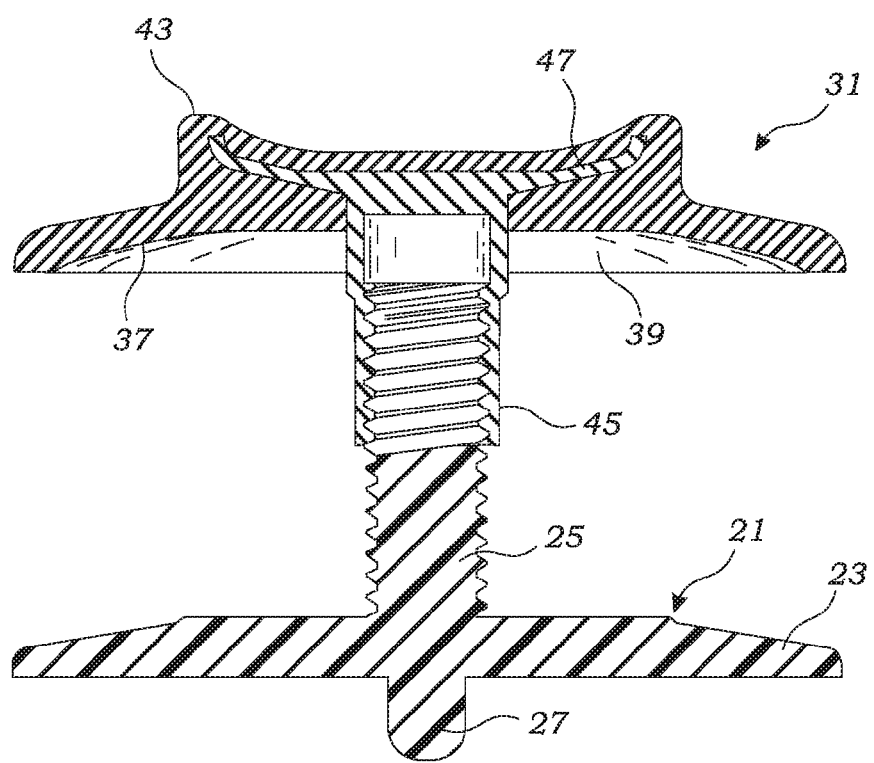
FIG. 4 is a side cut-away view of the fastener assembly for insulation blanket of the present invention.
Figure 5:
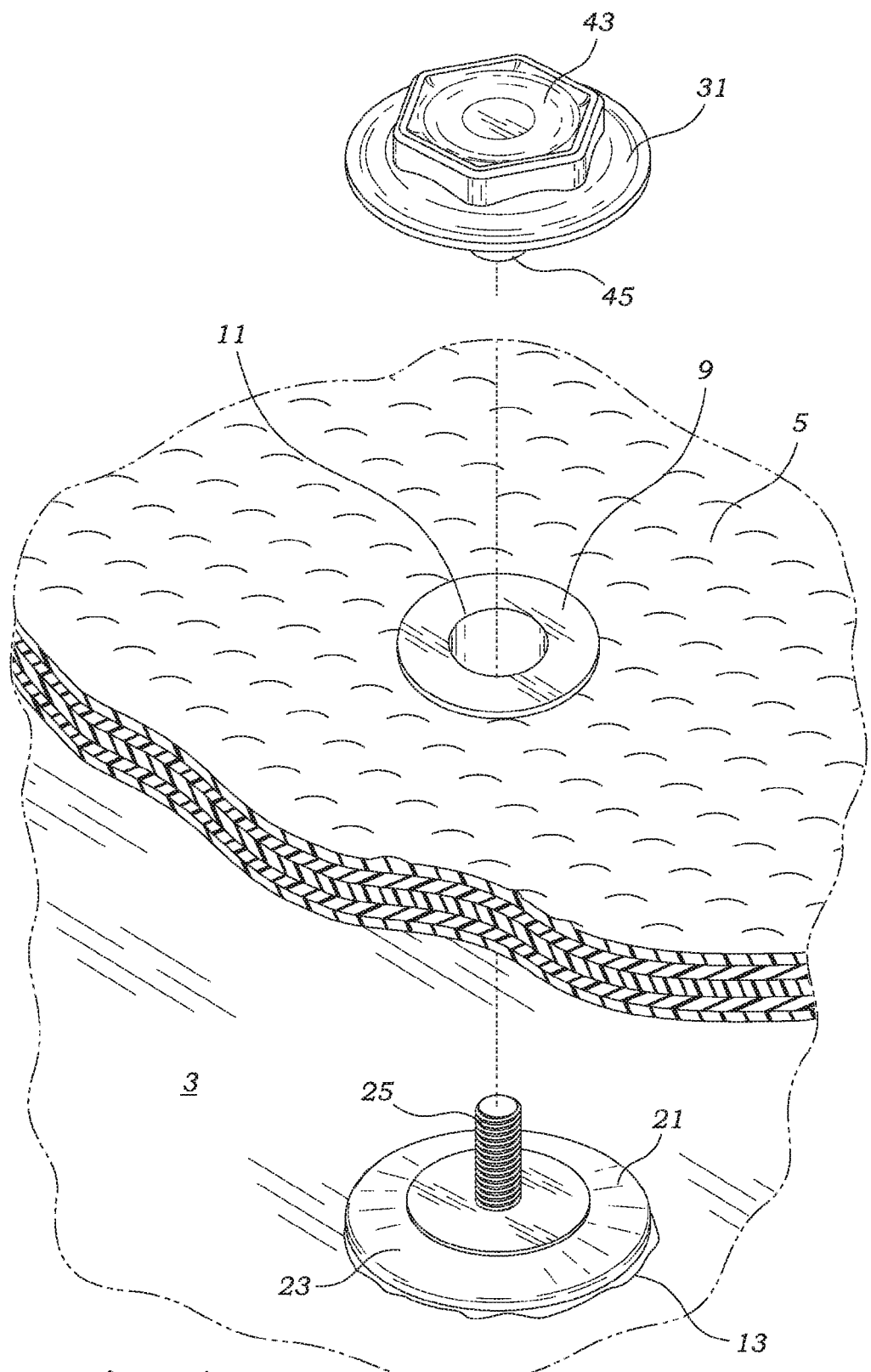
FIG. 5 is a top perspective exploded view of the fastener assembly of the present invention including insulation blanket and substrate.
Figure 6:
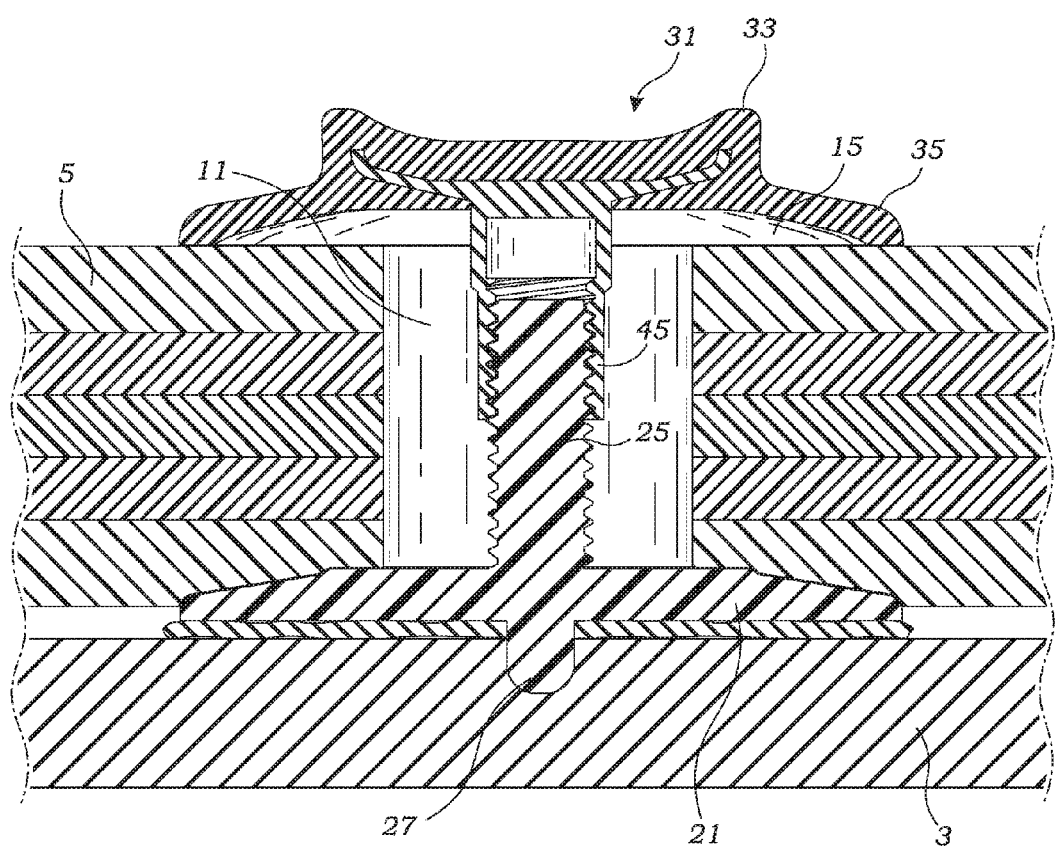
FIG. 6 is a side cut-away view of the fastener assembly for insulation blanket of the present invention including insulation blanket and substrate.

With reference to FIGS. 1-6, the fastener assembly 1 of the present invention is for use in supporting and affixing an insulation blanket 5 to a substrate 3, such as an aircraft engine nacelle. The substrate 3 is a wall panel or the like that separates an environment having a relatively high temperature from another environment having cooler temperatures. It is anticipated that the substrate is typically formed from light weight metals or composite materials which may form the nacelle for an aircraft engine. Meanwhile, the insulation blanket 5 is mounted to the substrate 3 to insulate and thereby safeguard adjacent structures and components from undesirable thermal damage. As illustrated in FIGS. 5 and 6, the insulation blanket 5 may include exterior refractory materials as well as multiple internal insulating layers. As best illustrated in FIG. 5, the insulation blanket 5 includes one or more mounting holes 11 which preferably are lined with grommets 9. As illustrated in FIG. 5, preferably each grommet 9 has a round short rim.

The fastener assembly 1 includes two primary components including an attachment member 21 affixed to the substrate 3 and a cap fastener 31 for holding the insulation blanket 5 in place. As illustrated in FIGS. 1-6, the attachment member 21 includes a flat base 23 and a first fastener member 25, which as illustrated in the figures, is preferably a male threaded stud. In addition, the attachment member may include an alignment tab 27. The alignment tab 27 projects downwardly from the base 23 and is provided only where the substrate 3 includes a hole or notch for receiving and positioning the attachment member 21. Preferably the base 23 is made of a plastic, such as a woven polyimide and has a flat bottom surface for affixing to the substrate 5 using an adhesive 13.

Meanwhile, the fastener assembly's cap fastener 31 includes a cap member 33 which is preferably round and has an exterior side 35 and an interior side 37. As illustrated in FIGS. 5 and 6, the cap member 33 is radially enlarged so as to have a size and shape greater than the insulation blanket's mounting hole 11. The cap fastener 31 further includes a second fastener member 45 capable of fastening to the attachment member's first fastener member 25. As illustrated, the cap fastener's second fastener member is preferably a female threaded extension 45 sized to affix to the attachment member's male threaded stud 25.

The cap member's interior 37 includes a circular recess 39 which is concentrically formed around the female threaded extension 45. As best illustrated in FIG. 4, it is preferred that the cap member's interior side 37 have a concave shape with the female threaded extension projecting concentrically from its middle so as to form the circular recess 39. As best illustrated in FIGS. 4 and 6, the cap member's circular recess 39 forms an insulating cavity 15. More specifically, the cap member's circular recess 39 allows the periphery of the cap member to engage an insulation blanket 5 so as to maintain the insulation blanket against the substrate 3. However, the remaining circular recess 39 portion of a cap member has little or no engagement with the insulation blanket 5 so as to create the insulating cavity 15 which provides reduced thermal conduction and a corresponding increase in thermal insulation.

It is preferred that the cap fastener's cap member 33 be made of a composite or plastic having excellent thermal insulation properties such as a woven polyimide. However, it is preferred that the cap member's second fastener member, preferably a female threaded extension 45, be made of a metal for high strength, such as a 300 series stainless steel. To prevent disengagement of the cap member 33 from the female threaded extension 45, it is preferred that the female threaded extension include a head, preferably having one or more radially projecting flanges 47 which are encapsulated within the cap member 33. Furthermore, it is preferred that the head have a diameter larger than the diameter of the blanket's hole so that in the event that the cap member's composite or plastic failed, the fastener head would retain the blanket against the substrate. Though not shown in the figures, it is preferred that the attachment member's male threaded stud 25 also include a radially projecting region or flanges which are encapsulated within the attachment member's base 23.

Where the attachment member and cap fastener are affixed together utilizing male and female threaded components, it is preferred that the cap member have a shape so as to allow it to be rotated by a tool. To this end, any of many keyed slots or projecting shapes may be selected by those skilled in the art. However, as illustrated in FIGS. 1-6, a preferred cap member 33 has a hexagonal projection 43 sized for receipt within a ¾ inch hexagonal socket tool commonly carried by aircraft machinist and repairmen.

While several particular forms of the invention have been illustrated and described, it will be apparent that various modifications can be made without departing from the spirit and scope of the invention. Therefore, it is not intended that the invention be limited except by the following claims.

Having described my invention in such terms so as to enable persons skilled in the art to understand the invention, recreate the invention and practice it, and having presently identified the presently preferred embodiments thereof, We claim:

1. A fastener assembly for affixing an insulation blanket onto a substrate, the attachment assembly comprising:
   an attachment member for attachment to a substrate, said attachment member including a first fastener element in the form of a male threaded element;
   a cap fastener including a second fastener element made of metal and a radially enlarged cap member made of plastic and having an exterior side and an interior side, said second fastener element having a head and a female threaded extension constructed to affix to said first fastener element's male threaded element, said cap member encapsulating said second fastener's head so as to prevent rotation of said cap member relative to said second fastener element, said second fastener element's female threaded extension extends from said cap member's interior side; and
   said cap member's exterior side includes a hexagonal projection and said cap member's interior side a circular recess surrounding said second fastener element's extension creating a circular insulating cavity.

2. The fastener assembly of claim 1 wherein said cap member is made of polyimide and said second fastener element is made of stainless steel.

3. The fastener assembly of claim 1 wherein said attachment member includes a base for adherence to a substrate.

4. The fastener assembly of claim 1 wherein said cap member's interior surface has a substantially concave surface forming said circular recess.

5. A fastener assembly affixing an insulation blanket onto a substrate, the attachment assembly comprising:
   a substrate;
   an insulation blanket having a mounting hole;
   an attachment member including a base adhered to said substrate and a male threaded element;
   a cap fastener including a radially enlarged cap member made of plastic having a radial size and shape greater than said mounting hole, said cap member having an exterior side and an interior side, said cap fastener further including a second fastener element made of metal which includes a head and a metal female threaded element extending from said cap member's interior side projecting at least partially through said mounting hole to threadably affix to said male threaded element, wherein said cap member's interior side overlies and engages said insulation blanket in a region surrounding said mounting hole so as to affix said insulation blanket to said substrate; and
   said cap member encapsulates said head so as to prevent rotation of said cap member relative to said second fastener element, said second fastener element's extension extends from said cap member's interior side, said cap member's interior side having a substantially concave surface forming a circular recess surrounding said second fastener element creating a circular insulating cavity in conjunction with said insulation blanket.

6. The fastener assembly of claim 5 wherein said second fastener element's head has a diameter larger than the diameter of said blanket hole.

* * * * *